United States Patent [19]

Vaughan et al.

[11] Patent Number: 5,549,881
[45] Date of Patent: Aug. 27, 1996

[54] PROCESS FOR PREPARING A SEEDED HIGH-SILICA ZEOLITE HAVING THE FAUJASITE TOPOLOGY

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 347,004

[22] Filed: Nov. 29, 1994

Related U.S. Application Data

[63] Continuation of Ser. No. 200,987, Feb. 24, 1994, abandoned.

[51] Int. Cl.[6] ................................................. C01B 39/20
[52] U.S. Cl. ......................... 423/703; 423/705; 423/709; 423/DIG. 21
[58] Field of Search ............................. 423/703, 705, 423/707, 709, DIG. 21; 502/79

[56] References Cited

U.S. PATENT DOCUMENTS

| | | | |
|---|---|---|---|
| 4,166,099 | 8/1979 | McDaniel et al. | 423/709 |
| 4,340,573 | 7/1982 | Vaughan et al. | 423/DIG. 21 |
| 4,608,236 | 8/1986 | Strack et al. | 502/79 |
| 4,631,262 | 12/1986 | Altomare | 423/709 |
| 4,657,748 | 4/1987 | Vaughan et al. | 423/707 |
| 4,714,601 | 12/1987 | Vaughan | 423/707 |
| 4,879,103 | 11/1989 | Vaughan | 423/705 |
| 4,931,267 | 6/1990 | Vaughan et al. | 423/705 |
| 4,965,059 | 10/1990 | Vaughan et al. | 423/707 |
| 5,154,904 | 10/1992 | Kleinschmit et al. | 423/709 |
| 5,206,005 | 4/1993 | Vaughan et al. | 423/707 |

*Primary Examiner*—Mark L. Bell
*Assistant Examiner*—David Sample
*Attorney, Agent, or Firm*—Ronald D. Hantman

[57] ABSTRACT

A process to make a seed high silica zeolite having a faujasite structure and a silica to alumina ratio greater than 6, and containing tetrapropyl ammonium and/or tetrabutyl ammonium trapped within the supercages of said structure. The optimally seeds are aged for specific times.

5 Claims, 2 Drawing Sheets

PROCESS FOR PREPARING A SEEDED HIGH-SILICA ZEOLITE HAVING THE FAUJASITE TOPOLOGY

This is a continuation of application Ser. No. 200,987, filed Feb. 24, 1994 now abandoned.

FIELD OF THE INVENTION

The present invention relates to an improved seeding process for the synthesis of a high silica zeolite having the faujasite structure and containing organic tetrapropyl and, or tetrabutyl ammonium ions and/or bis (2-hydroxyethyl) dimethyl ammonium. The product may be employed in catalytic, absorbent or separation applications, particularly in cracking and hydrocracking catalysts.

BACKGROUND OF THE INVENTION

Large pore zeolites with high silica to alumina ratios, i.e., of at least four, are desirable because of their particular catalytic selectivity and their thermal stability; the latter is a property particularly important when the zeolite is used as catalyst or in adsorption procedures wherein exposure to high temperatures would be expected. Although faujasite zeolites having silica to alumina ratios of less than four can be readily synthesized by a variety of methods, as disclosed, e.g., in U.S. Pat. Nos. 2,882,244 and 4,178,352, methods for preparing faujasite polymorphs of higher ratios generally involve several weeks of crystallization and result in poor yields of product, as reported by Kacirek, *J. Phy. Chem.*, 79, 1589 (1975).

The use of quaternary ammonium salts as templates or reaction modifiers in the preparation of synthetic crystalline aluminosilicates (zeolites), first discovered by R. M. Barrer in 1961, has led to preparation of zeolites with high silica to alumina ratios which are not found in nature. A review provided by Barrer in *Zeolites*, Vol. I, p. 136 (October, 1981) shows the zeolite types which are obtained using various ammonium organic bases as cation. In addition, Breck, *Zeolite Molecular Sieves*, John Wiley (New York, 1974), pp. 348–378, provides a basic review of zeolites obtained using such ammonium cations in the synthesis thereof, as does a review by Lok et al. (Zeolites, 3, p. 282, 1983)).

The Si/Al ratios of a variety of readily synthesized NaY materials ($SiO_2/Al_2O_3 < 6$) can be increased by a wide range of chemical or physical chemical treatments. However, these processes usually involve removal of Al from the zeolite framework and creation of a metastable defect structure, followed by filling the defects with Si from another part of the structure by further chemical treatments or hydrothermal annealing. Typical treatments use steam, e.g., U.S. Pat. No. 3,293,192; acid leaching, e.g., U.S. Pat. No. 3,506,400; treatments with EDTA, e.g., U.S. Pat. No. 4,093,560; treatment with $SiCl_4$ (Beyer and Belenyakja, *Catalysis by Zeolites* S, p. 203 (1980), Elsevier Press.); treated with $CHF_3$, i.e., 4,275,046; or treated with other chemicals. The products are often called "ultra stable" faujasites (cf. Maher and McDaniel Proceedings Intl. Conference on Molecular Sieves, London, 1967) because of their very high thermal and hydrothermal stability. However, such chemical processing often yields variable products, requires multi-step processing, often using highly corrosive environments, and usually involves a yield debit in the form of partly collapsed or blocked zeolite product. Few of the modified materials have the product quality of the starting sample because the process of modification involves partial destruction of the lattice and/or deposition of detrital reaction products within the pores of the structure. This usually results in the development of a secondary meso pore structure (Lohase et al, Zeolites, 4, p. 163 (1984)) which, although of some catalytic interested, will be less controlled and selective then the parent structure. Other methods of so called secondary synthesis using $(NH_4)_2 SiF_6$ in aqueous solution have also been demonstrated to yield higher silica zeolites (U.S. Pat. No. 4,503,023). Methods of directly synthesizing high silica faujasites, without such "secondary synthesis" treatments, would therefore be useful in optimizing both the zeolite product and the process for its production.

Although the disclosed composition is quite thermally stable in its own right because of its high silica content, that thermal stability makes the inventive composition particularly useful as a starting material for the dealumination processes described above. Since the number of aluminum atoms in the framework of the inventive composition is lower than in zeolite Y, removal of these atoms causes less framework metastability during dealumination, allowing the formation of near pure silica faujasites.

The objective of the present invention is to develop improved faujasite preparation methods yielding high silica materials, where the organic templates are not locked into the small cavities in the structure, but are instead present in the large "super cages" from which they can be readily removed without disruption and degradation of the host lattice. One such group of faujasite polymorphs are designated ECR-32 and ECR-4 (see U.S. Pat. Nos. 4,714,601, 4,965,059, and 4,931,267). The principal objective of this invention is to significantly improve the processes for making such materials.

SUMMARY OF THE INVENTION

The present invention is an improved process to prepare by direct synthesis a high silica crystalline zeolite having the faujasite structure and a $SiO_2/Al_2O_3$ mole ratio of at least four. The improvement involves the discovery that the exact nature of the "seed" component may dramatically effect the crystallization time of the said ECR-4/32. At low ratios of product such as the prior art synthetic faujasite materials designated X and Y, the seed age times do not materially influence the crystallization times. Surprisingly, in the case of ECR 4/32, an optimum seed aging reduces the time of crystallization by a factor of up to three or four, greatly reducing the cost of the product. The chemical composition for this zeolite product, expressed in terms of mole ratios of oxides, is in the range:

0.2 to 0.8 $T_2O$:0.2 to 0.8 $Na_2O$:$Al_2O_3$:6 to 18 $SiO_2$:$xH_2O$ wherein T represents bis (2hydroxyethyl)-dimethyl ammonium, tetrapropyl and or tetrabutyl-ammonium organic cation, and x represents 0 or an integer from 1 to 25, depending on composition and degree of hydration. The more preferred composition for the zeolite is in the range: 0.2 to 0.8 $T_2O$:0.2 to 0.6 $Na_2O$:$Al_2O_3$:6 to 16 $SiO_2$:$xH_2O$. The most preferred composition has the same molar oxide ratio as does the more preferred composition save the $SiO_2/Al_2O_3$ ratio which is 8 to 14.

The aluminosilicate herein may be used as a sorbent or as a catalyst, e.g., as a hydrocarbon conversion catalyst for, e.g., cracking, hydrocracking, reforming, paraffin isomerization, aromatization and alkylation. When the product is used as a catalyst, [the alkyl or hydroxyalkylammonium cations trapped in the super cages of the faujasite structure are first removed by calcination,] then the product may be exchanged with cations from Groups II through VIII of the Periodic Table to remove the excess sodium ions which may be undesirable.

The process to the zeolite includes the steps of preparing a reaction mixture comprising an oxide of sodium, a bis (2-hydroxyethyl)dimethyl, tetrapropyl and/or hydroxypropyl (or similar tetrabutyl) ammonium salt, water, a source of silica, a source of alumina, and optimized sodium aluminosilicate nucleating seeds of this invention.

The reaction mixture has a composition, in terms of mole ratios of oxides, within the following ranges:

| | |
|---|---|
| $(Na, T)_2O:Al_2O_3$ | 3 to 15 |
| $SiO_2:Al_2O_3$ | 9 to 36 |
| $H_2O:Al_2O_3$ | 120 to 500 | where T represents a tetra-alkyl or hydroxyalkyl ammonium cations and the seeds being present in an amount to yield 0.1 to 10 mole percent of the total final alumina content in the zeolite.

For optimum results, a specific seed composition must be aged for specific times and temperatures. The reaction mixture is blended with the seed slurry sufficiently to form a substantially homogeneous mixture, which is maintained at a temperature between about 80° C. and 160° C. under autogenous pressure for a sufficient period of time to form crystals of the aluminosilicate zeolite. The zeolite crystals are then recovered by filtration, centrifugation or other means. The optimum seed mixture is defined by composition, age time and age temperature. Although increasing the seed age temperature reduces the time to maturity, higher temperatures quickly grow the seeds into an ineffective size. The requirement for tight control increases with increasing batch size, making control, close temperature and aggitation necessary on a commercial scale.

DESCRIPTION OF THE PREFERRED EMBODIMENTS

Figure 1:
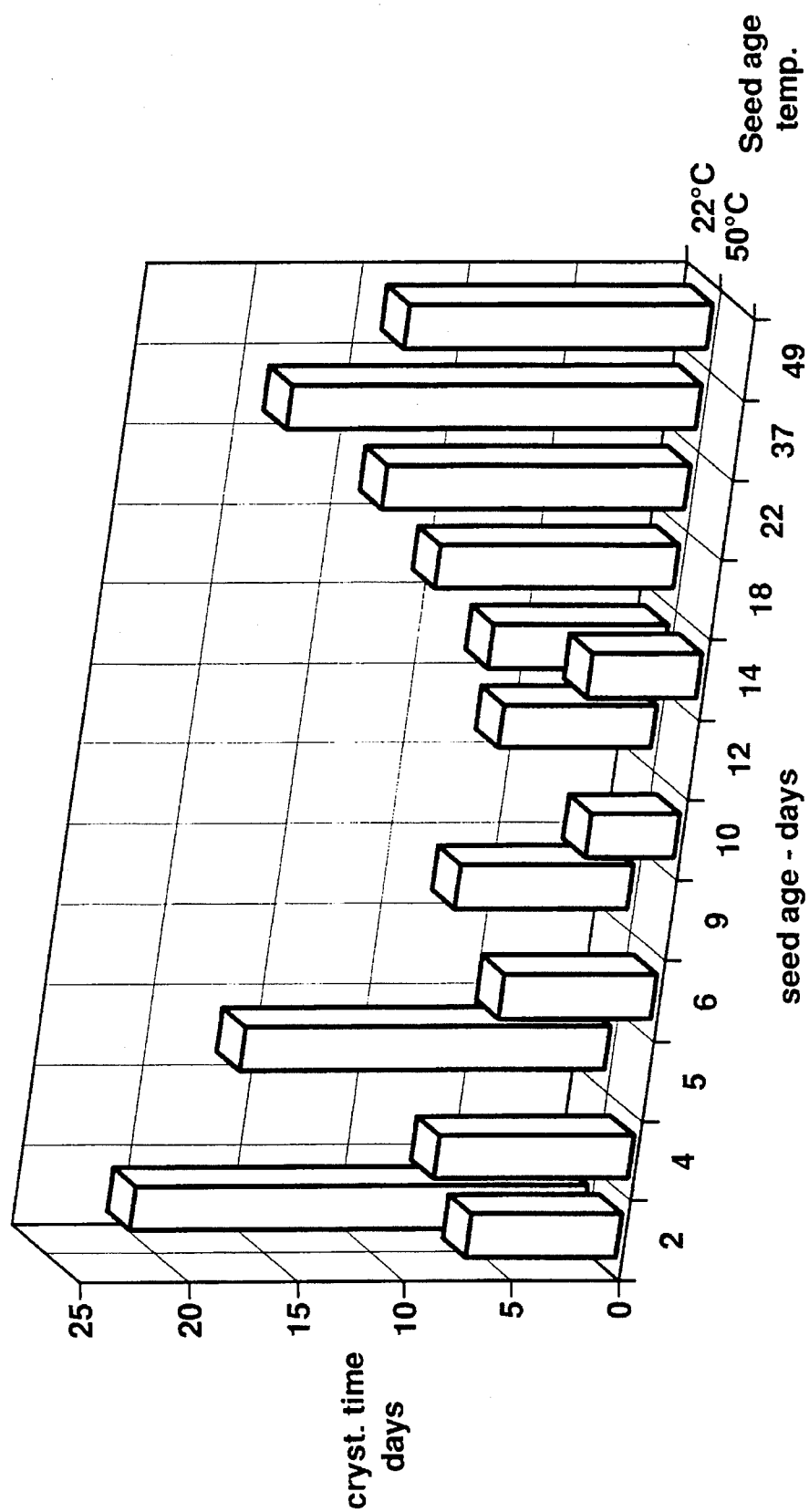
FIG. 1 shows the effect of seed age and temperature on zeolite crystallization rates exemplified in Examples 1 through 18.

The aluminosilicate herein synthesized generally will have the formula, in terms of mole ratios of oxides, in the range:

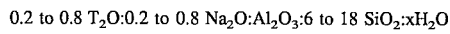

0.2 to 0.8 $T_2O$:0.2 to 0.8 $Na_2O:Al_2O_3$:6 to 18 $SiO_2:xH_2O$ or most preferably 0.40 to 0.80 $T_2O$:0.2 to 0.6 $Na_2O:Al_2O_3$:8 to 14 $SiO_2:H_2O$ where x is 0–20 and T is tetraalkyl ammonium cations preferably selected from tetrapropyl, tetrabutyl and bis (2-hydroxyethyl) dimethyl ammonium. Part of the aluminum in such compositions may be partly replaced by cations of other metals(m), such as Ga, Ge, Fe Cr, Ti, Mn, V, P, B, Ni, Co and Zn, although never to exceed 30% of the framework Al component.

These alkyl ammonium cations are relatively large ions which are not trapped within the small sodalite cages of the aluminosilicate faujasite structure, but are present in the super cages of the structure, as shown by the low temperature at which the organic template is removed from the supercage.

Minor variations in the mole ratios of the oxides within the ranges given in the chemical formulas above do not substantially alter the structure or properties of the zeolite. In addition, the number of waters of hydration x in the formula will not be the same for each preparation and will depend mainly on the degree to which the aluminosilicate is dried, and the amount of template. Generally, increasing the $SiO_2/Al_2O_3$ ratio of the reaction gel increases the $SiO_2/Al_2O_3$ ratio of the product.

In order to convert the inventive high silica faujasitic zeolites into catalysts, the organic ions in the "super cage" of the zeolite are first exchanged, desorbed or degraded at high temperature. By comparison to other zeolites having ammonium ions trapped in their smaller cages, the temperature of calcination is significantly lower. As even large decomposition organic fragments may easily diffuse through the large pores of the zeolite ECR-4/32, bond breakage and lattice degradation associated with the escape of such fragments from the smaller cages is generally not observed in ECR-4/32.

The exchangeable cations, which may partially or fully replace the sodium ions wherever they may be found together with the organic ammonium ions in the large cages of the faujasite structure, may be cations of metals from any one of Groups I through VII of the Periodic Table (such designation being explained in Kirk-Othmer, Encyclopedia of Chemical Technology, 2nd Edition, r.8, page 94(1965)) including rare earth metals, depending on the end use desired. Preferably, the cations will be mono-, di- and trivalent metal cations, particularly from Groups I, II or III of the PeriodicTable, such as barium, calcium, cesium, lithium, magnesium, potassium, strontium, zinc, or the like, or hydrogen, rare earth metals, or ammonium ions. Optimized basic catalysts can be obtained by exchanging with sodium cations after removal of the alkylammonium cations. The presence of these exchangeable cations will generally not cause a substantial alteration of the basic crystal structure of the aluminosilicate. Particularly preferred are mono- and divalent cations, as they are more easily included in the pores of the zeolite crystal. Any ion exchange technique may be employed such as those discussed, for example, in U.S. Pat. No. 3,216,789, but may include aqueous and non-aqueous solvents and molten salts.

The aluminosilicate herein may be prepared by a process in which a reaction mixture, generally a slurry, is formed comprised of an oxide of sodium, water, the organic ammonium salt, a source of silica, a source of alumina, and sodium zeolitic (aluminosilicate) nucleating seeds. The oxide of sodium may be, e.g., sodium hydroxide, and the organic ammonium salt may be a sulfate, nitrate, hydroxide or halide salt. Often it is preferably a halide such as the chloride, iodide or bromide salt because of lower cost. The silica may be derived from sources such as, e.g., silica gels, silicic acid, aqueous colloidal silica sols as described, for example, in U.S. Pat. No. 2,574,902, reactive amorphous solid silicas such as fume silicas and chemically precipitated silica sols, and potassium or sodium silicate, preferably sodium silicate. The alumina may be derived from sources such as, e.g., activated alumina, alumina trihydrate, sodium aluminate, alum, kaolin, metakaolin or the like. It is noted that the sodium oxide may be provided not only directly be adding, e.g., sodium hydroxide to the mixture, but also indirectly from the source of silica and/or the source of alumina if, for example, sodium silicate and sodium aluminate (prepared by dissolving NaOH and $Al_2O_3.3H_2O$ in water) are respectively employed as at least one of the silica and alumina sources. The preferred sources of alumina are hydrated alumina and an aluminum salt selected from the chloride, sulfate and nitrate salts.

The aluminosilicate nucleating seeds for the reaction mixture, also known as zeolitic nucleation centers, comprise of a slurry of zeolite solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows:

4 to 30 $Na_2O$:1 to 9 $Al_2O_3$:3 to 30 $SiO_2$:250 to 2000 $H_2O$

Figure 2:
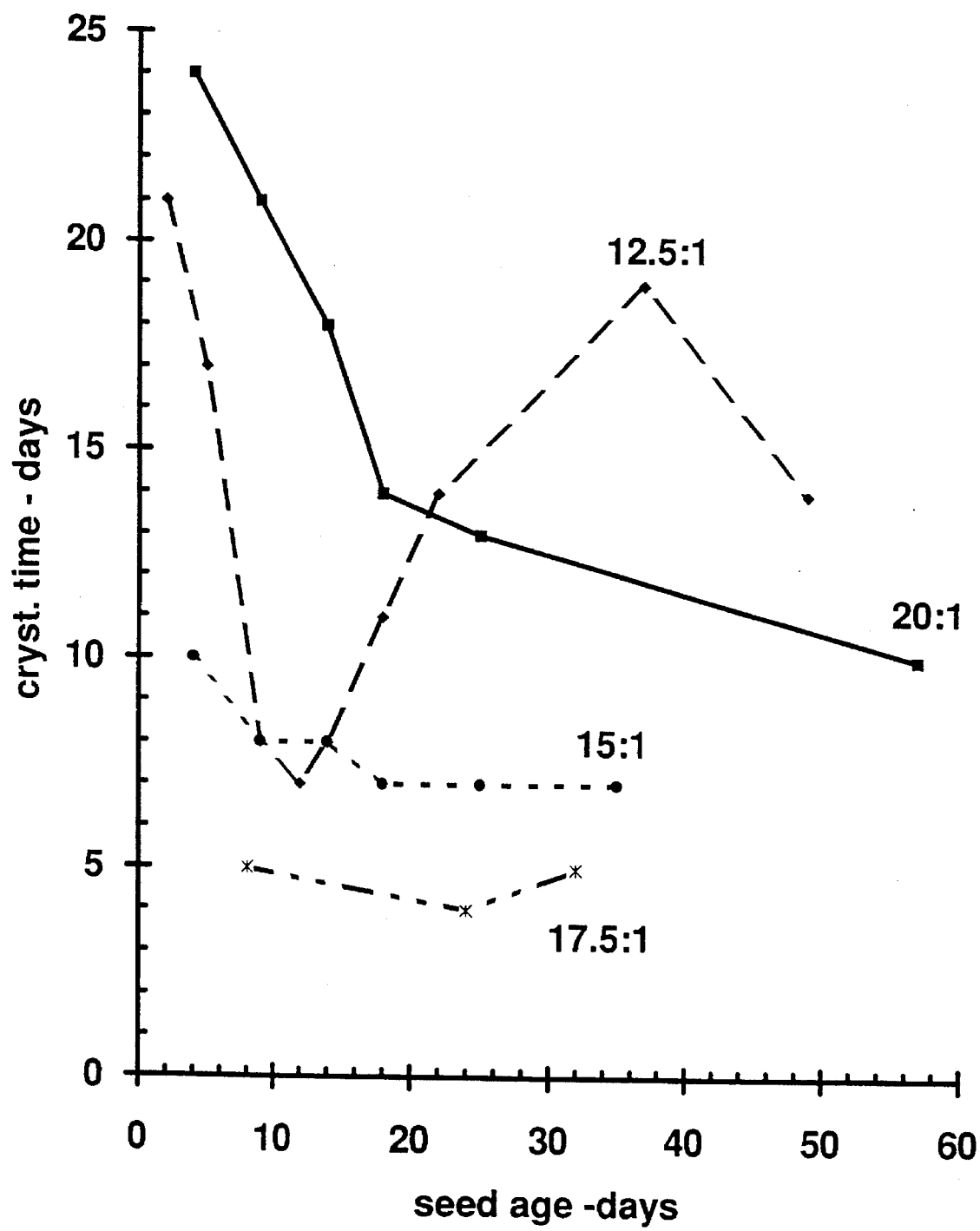
FIG. 2 shows optimun seed age as a function of seed Si/Al$_2$ ratio.

Such slurries of nucleating seeds may be prepared in the composition ranges disclosed in U.S. Pat. Nos. 3,808,326 and 4,178,352, the disclosures of which are incorporated by reference. In general, the preparation procedure involves mixing of sodium silicate, sodium aluminate and water together and aging the resulting slurry. The optimization of this synthesis requires the specific aging of this seed component within relatively narrow ranges—quite unlike the prior art broad disclosures. Such specific aging is well defined in FIG. 1, as is the influence of specific seed compositions (FIG. 2).

The amount of nucleating seeds present in the reaction mixture is expressed in terms of the percentage of the total molar alumina content in the aluminosilicate product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 2 to 10 mole percent. Slurries comprising recycled products of the process disclosed herein will also serve as nucleation seeds, but may not yield the reported shortest crystallization times of this invention.

The relative amounts of ingredients in the reaction mixture will be such that the mixture has a composition, in terms of mole ratios of oxides, within the following ranges:

| Oxide Constituents | Ranges of Mole Ratios |
| --- | --- |
| (Na, T)$_2$O:Al$_2$O$_3$ | 3 to 15 |
| SiO$_2$:Al$_2$O$_3$ | 9 to 36 |
| H$_2$O:Al$_2$O$_3$ | 120 to 500 | where T represents an organic ammonium group as described above. Preferably, the mole ratio of $H_2O$ to $Al_2O_3$ in the reaction mixture ranges from 200 to 400, and the mole ratio of $SiO_2$ to $Al_2O_3$ from 15 to 30. When metallic alumino silicates are the target product Al in the above ratios will be replaced by (Al+m) and the ratio of m:(Al+m) will not exceed 0.3.

The order of mixing the ingredients is not essential, and all ingredients may be added simultaneously. In one preferred method of preparation a colloidal silica solution, a slurry of nucleating seeds and an organic ammonium halide solution are added to a blender, followed by slow addition, with mixing, of a sodium aluminate solution and an alum solution. Additional water is added to the resulting slurry. The reaction mixture is ordinarily prepared in a container made of glass, TEFLON, or metal or the like which should be closed to prevent water loss.

After the reaction mixture is formed it may be homogenized by thorough blending so as to be substantially homogeneous in texture. This step is to ensure that the aluminosilicate product ultimately obtained is not a mixture of products and thus impure. The mixing may take place in any vessel in which complete mixing is effected, e.g., a blender, in line pump or other highly agitated system.

The homogenized mixture is then placed in a reactor, ordinarily one which can withstand elevated pressures such as a tetrafluoroethylene-lined jar or an autoclave, where it is maintained at a temperature of between about 80° C. and 160° C., preferably 90° and 140° C. For commercial purposes, preferably no greater than 140° C. The exact temperature will depend, for example, on the amount of sodium oxide present and the length of time employed for reaction. When the homogenized mixture is heated it is maintained at autogenous pressures which will depend on the temperature employed. Lower pressures of 1 atm may be adequate for temperatures at the lower range but at higher temperatures up to 160° C. pressures of up to about 3 to 10 atm or higher may be achieved. The amount of time required for heating will depend mainly on the temperature employed, so that at 100° C. the heating age time will be greater than at 120° C. The specific preferred reaction temperature will depend on the economics of autoclave use and productivity.

When the aluminosilicate crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried as in a kiln, followed by calcination to remove the alkylammonium ions.

The aluminosilicate ECR-32 of this invention may be used as a sorbent or as a catalyst, e.g., in a hydrocarbon conversion process. ECR-41/32, having a faujasite structure and a mole ratio of $SiO_2/Al_2O_3$ of at least six with organic ammonium templates removable below about 400° C., as shown by thermogravimetric analysis, can be used in paraffin isomerization, aromatization, and alkylation and in the reforming, hydrocracking and cracking and isomerization of lube stocks, fuels and crude oils. To be employed for these applications, the aluminosilicate usually is first calcined to remove the alkylammonium template. Then cation exchanged to a catalytically active form. Dealumination and demetallation may be an important part of such preparation procedures. The said ECR 4/32 is then heated to temperatures of up to about 500° C. or more until most of the water of hydration is removed.

ANALYTICAL PROCEDURES

A zeolite may be definitively identified by its x-ray diffraction pattern and chemical composition obtained by a variety of bulk chemical analyses. The unit cell measurement for various faujasites, in particular, has become a measurement (ASTM method D-3942-80) standardized to reflect the Si/Al ratio of the pure sodium form synthetic faujasite. Unfortunately, substitution of cations other than $Na^+$ into faujasite renders the established "unit cell vs. composition" relationships valueless. Since ECR-4/32 contains organic cations in addition to $Na^+$, unit cell correlations obtained by these methods have little value, until the said ECR-4/32 is first purged of the organic template, then sodium exchanged. Such values for Na-ECR-32 are included in the examples. Na-ECR-4/32 may be defined by the following essential diffraction lines.

TABLE A

MAJOR X-RAY DIFFRACTION PEAKS FOR ECR-32

| d Spacing (Å) | Relative Intensity |
| --- | --- |
| 14.05–14.20 | VS |
| 8.60–8.70 | M |
| 7.32–7.44 | W |
| 7.00–7.15 | W |
| 5.58–5.65 | S |
| 4.68–4.75 | M |
| 4.30–4.35 | M |
| 3.85–3.90 | W |
| 3.70–3.75 | M–S |
| 3.40–3.45 | W |
| 3.25–3.30 | M |
| 2.97–3.05 | W |
| 2.87–2.90 | M–W |
| 2.81–2.84 | M |
| 2.72–2.75 | W |
| 2.59–2.63 | W |
| 2.34–2.37 | W |

VS = 100–80; S = 80–40; M = 40–15; W = 3–15 in absolute value ranges)

A valuable indirect measurement of Si/Al ratio has been developed recently which, to a first approximation, is not significantly influenced by variable cations contents. Known as $^{29}$Si- magic angle spinning nuclear magnetic resonance (MSA-NMR), it measures the relative number of Si atoms surrounded by 4 Al, (3Al+1Si), (2Al+2Si), (1Al+3Si) and 4Si, from which the total average Si/Al ratio can be readily calculated (Melchior et al, J. Amer. Chem. Soc., v. 104, p. (1982)). Compared with the conventional Y faujasite, ECR-4/32 compositions may clearly be differentiated on the basis of relative peak values, vis., in the case of ECR-4/32 the number of Si atoms having zero and one Al neighbors is greater than the number of Si atoms having 2 and 3 Al neighbors. For zeolite Y the reverse is true.

ECR-32: Si(0Al)+Si(1Al)>Si(2Al)+Si(3Al)

Zeolite Y: Si(0Al)+Si(1Al)<Si(2Al)+Si(3Al).

It should be apparent that $^{29}$Si-MAS-NMR spectra give a more reliable indication of the number of Si and Al atoms in a sample then would a comparable bulk chemical test. The MAS-NMR ignores detrital or adsorbed and dissolved silicon and aluminum atoms since it measures those atoms only when they are in particular spatial relationship to each other. Bulk chemical tests have no way to make such a differentiation.

A further differentiating characteristic of ECR-4/32 is that the organic template is located in the "super cage" rather than the smaller sodalite cage. Although this can be demonstrated using $^{13}$C-MAS-NMR, it is also readily demonstrated by a simple thermogravimetric experiment in which a small sample is heated in a controlled fashion and the weight loss on template "burn off" at high temperature is recorded.

EXAMPLE 1

Preparation of Nucleant Seeds having $SiO_2/Al_2O_3=12.5$.

A nucleant seed solution of stoichiometry, 13.33 $Na_2O$:$Al_2O_3$:12.5 $SiO_2$:267 $H_2O$, was prepared by first preparing a sodium aluminate solution by dissolving 60.0 g. NaOH in 100 ml. distilled water. To this solution 12.0 g. of aluminum trihydrate ($Al_2O_3.3H_2O$; 156.01 g./mole; ALCOA C-31) was added and the solution was heated with stirring on a hot plate/magnetic stirrer until the alumina dissolved. The solution was cooled to room temperature. To a one liter blender was added 201.6 g. of N brand sodium silicate solution ((P.Q. Corp. 8.9% $Na_2O$; 28.7% $SiO_2$) and 100 g. of distilled water. With vigorous stirring the sodium aluminate solution was slowly poured in and then rinsed in with distilled water. Enough distilled water was then added to bring the total weight of the mixture to 500 g. The mixture was again homogenized and then stored in a closed plastic or Teflon container. It was allowed to age at room temperature 22° C. for 2 to 49 days before use.

EXAMPLEs 2–12

Preparation of ECR-32 using ambient temperature aged seeds.

A sodium aluminate solution was prepared by dissolving 59 g. NaOH in 100 ml. distilled water. To this solution 75 g. of aluminum trihydrate ($Al_2O_3.3H_2O$; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 250 g.

A series of reactant gels were prepared having the stoichiometry:

3.6 $TPA_2O$:1.2 $Na_2O$:$Al_2O_3$:18 $SiO_2$:275 $H_2O$:0.99 $Na_2O_4$.

All gels were identically prepared except for the age of the nucleant seeds. To a 2 liter plastic beaker were added, while mixing with a spatula, 324.6 g. of 40% colloidal silica (HS-40, dupont Ludox; 40 wt. % $SiO_2$), 83.7 g. nucleant seeds (aged 2–49 days), 472.2 g. of aq. 40% TPAOH,, 38.3 9. sodium aluminate solution, as made above, 55.1 g. of 50% $Al_2(SO_4)_3.17H_2O$ solution, and enough distilled water to bring the total weight of mixture to 1000 g. The white gel was transferred to a blender and thoroughly homogenized. The gel was then placed in 1000 ml. Teflon bottle and reacted in an air oven at 100° C.

Samples were taken periodically, filtered and washed with distilled water. Crystallization was followed by powder X-ray diffraction until completed. The following Table 1 lists the crystallization time of each experiment and clearly shows the preferred seed age time of 8 to 18 days. The optimization at this seed composition is shown graphically in FIG. 1.

TABLE 1

| Example | Seed Age | Cryst. Time |
| --- | --- | --- |
| 2 | 2 | 21 |
| 3 | 5 | 17 |
| 4 | 9 | 8 |
| 5 | 12 | 7 |
| 6 | 12 | 7 |
| 7 | 14 | 8 |
| 8 | 14 | 9 |
| 9 | 18 | 11 |
| 10 | 22 | 14 |
| 11 | 37 | 19 |
| 12 | 49 | 14 |

EXAMPLE 13

Preparation of Nucleant Seeds Aged at 50° C.

The seed composition of Example 1 was remade, and then stored in a closed Teflon container in an air oven at 50° C. for 2 to 14 days before use.

EXAMPLES 14–18

Preparation of ECR-32 using 50° C. Aged Seeds

A sodium aluminate solution was prepared by dissolving 59 g. NaOH in 100 ml. distilled water. To this solution 75 g. of aluminum trihydrate ($Al_2O_3 \cdot 3H_2O$; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 250 g.

A series of reactant gels were prepared having the stoichiometry:

$$3.6\ TPA_2O : 1.2\ Na_2O : Al_2O_3 : 18\ SiO_2 : 275\ H_2O\ 0.99\ Na_2SO_4.$$

All gels were identically prepared except for the age time of the nucleant seeds of Example 13. To a 2 liter plastic beaker were added, while mixing with a spatula, 324.6 g. of 40% colloidal silica (HS-40, dupont Ludox; 40 wt. % $SiO_2$), 83.7 g. nucleant seeds (Example 13), 472.2 g. of aq. 40% TPAOH, 38.3 g. sodium aluminate solution as made above, 55.1 g. of 50% $Al_2(SO_4)_3 \cdot 17H_2O$ solution, and enough distilled water to bring the total weight of mixture to 1000 g. The white gels were transferred to a blender and thoroughly homogenized. The gels were then placed in 1000 ml. Teflon bottle and reacted in an air oven at 100° C.

Samples were taken periodically, filtered and washed with distilled water. Crystallization was followed by powder X-ray diffraction until completed. The following Table 2 lists the crystallization time of each example and clearly shows the preferred seed age time of 9 to 18 days for room temperature aged seeds and 2 to 14 days for 50° C. aged seeds.

TABLE 2

| Example # | Seed age (days) | Seed age temp. | Crystallization time (days) |
|---|---|---|---|
| 14 | 2 | 50° C. | 7 |
| 15 | 4 | 50° C. | 9 |
| 16 | 6 | 50° C. | 7 |
| 17 | 10 | 50° C. | 4 |
| 18 | 14 | 50° C. | 5 |

EXAMPLE 19

Preparation of Nucleant Seeds having $SiO_2/Al_2O_3 = 17.5$

A nucleant seed solution of stoichiometry, $$13.33\ Na_2O : Al_2O_3 : 17.5\ SiO_2 : 267\ H_2O,$$

was prepared by first preparing a sodium aluminate solution by dissolving 48.5 g. NaOH in 100 ml. distilled water. To this solution 11.5 g. of alumina trihydrate ($Al_2O_3 \cdot 3H_2O$; 156.01 g./mole; ALCOA C-31) was added and the solution was heated with stirring on a hot plate/magnetic stirrer until the alumina dissolved. The solution was cooled to room temperature. To a one liter blender was added 269.8 g. of N brand sodium silicate solution (P.Q. Corp. 8.9% $Na_2O$; 26.7% $SiO_2$) and 60 g. of distilled water. With vigorous stirring the sodium aluminate solution was slowly poured in and then rinsed in with distilled water. Enough distilled water was then added to bring the total weight of the mixture to 500 g. The mixture was again homogenized and then stored in a closed plastic or Teflon container. It was allowed to age at room temperature for 2 to 32 days, or aged at 50° C. for 1 to 6 days before use.

EXAMPLES 20–25

Preparation of ECR-32

A sodium aluminate solution was prepared by dissolving 59 g. NaOH in 100 ml. distilled water. To this solution 75 g. of aluminum trihydrate ($Al_2O_3 \cdot 3H_2O$; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 250 g.

A series of reactant gels were prepared having the stoichiometry:

$$3.6\ TPA_2O : 1.2\ Na_2O : Al_2O_3 : 18\ SiO_2 : 275\ H_2O : 0.99\ Na_2SO_4.$$

All gels were identically prepared except for the age time and aging temperature of the nucleant seeds. To a 250 ml. plastic beaker were added, while mixing with a spatula, 42.5 g. of 40% colloidal silica (HS-40, dupont Ludox; 40 wt. % $SiO_2$), 11.9 g. nucleant seeds (Example 18), 63.7 g. of aq. 40% TPAOH, 5.17 g. sodium aluminate solution as made above, 7.44 g. of 50% $Al_2(SO_4)_3 \cdot 17H_2O$ solution, and enough distilled water to bring the total weight of mixture to 135 g. The white gels were transferred to a blender and thoroughly homogenized. The gels were then placed in 125 ml. Teflon bottle and reacted in an air oven at 100° C.

Samples were taken periodically, filtered and washed with distilled water. Crystallization was followed by powder X-ray diffraction until completed. The following Table 3 lists the crystallization time of each example and clearly shows the preferred seed age time of 8 to 32 days for room temperature aged seeds.

TABLE 3

| Example # | Seed age (days) | Seed age temp. | Crystallization time (days) |
|---|---|---|---|
| 20 | 8 | 22° C. | 5 |
| 21 | 24 | 22° C. | 4 |
| 22 | 32 | 22° C. | 5 |
| 23 | 1 | 50° C. | 14 |
| 24 | 3 | 50° C. | 14 |
| 25 | 6 | 50° C. | 10 |

In this case the ambient temperature aged seeds are clearly preferred.

EXAMPLE 26

Preparation of Nucleant Seeds having $SiO_2/Al_2O_3 = 15$.

A nucleant seed solution of stoichiometry, $$13.33\ Na_2O : Al_2O_3 : 15\ SiO_2 : 267\ H_2O,$$

was prepared by first preparing a sodium aluminate solution by dissolving 54.2 g. NaOH in 100 ml. distilled water. To this solution 11.8 g. of alumina trihydrate ($Al_2O_3 \cdot 3H_2O$; 156.01 g./mole; ALCOA C-31) was added and the solution was heated with stirring on a hot plate/magnetic stirrer until the alumina dissolved. The solution was cooled to room temperature. To a one liter blender was added 236.5 g. of N brand sodium silicate solution (P.Q. Corp. 8.9% $Na_2O$; 26.7% $SiO_2$) and 80 g. of distilled water. With vigorous stirring the sodium aluminate solution was slowly poured in and then rinsed in with distilled water. Enough distilled water was then added to bring the total weight of the mixture to 500 g. The mixture was again homogenized and then stored in a closed plastic or Teflon container. It was allowed to age at room temperature for 4 to 35 days.

EXAMPLES 27–32

Preparation of ECR-32

A sodium aluminate solution was prepared by dissolving 59 g. NaOH in 100 ml. distilled water. To this solution 75 g. of aluminum trihydrate ($Al_2O_3 \cdot 3H_2O$; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 250 g.

A series of reactant gels were prepared having the stoichiometry:

$$3.6\ TPA_2O : 1.2\ Na_2O : Al_2O_3 : 18\ SiO_2 : 275\ H_2O : 0.99\ Na_2SO_4.$$

All gels were identically prepared except for the age time of the nucleant seeds. To a 250 ml. plastic beaker were added, while mixing with a spatula, 43.2 g. of 40% colloidal silica (HS-40, dupont Ludox; 40 wt. % $SiO_2$), 11.6 g. nucleant seeds (Example 26), 63.7 g. of aq. 40% TPAOH, 5.17 g. sodium aluminate solution as made above, 7.44 g. of 50% $Al_2(SO_4)_3 \cdot 17H_2O$ solution, and enough distilled water to bring the total weight of mixture to 135 g. The white gels were transferred to a blender and thoroughly homogenized. The gels were then placed in 125 ml. Teflon bottle and reacted in an air oven at 100° C.

Samples were taken periodically, filtered and washed with distilled water. Crystallization was followed by powder X-ray diffraction until completed. The following table lists the crystallization time of each example and clearly shows the preferred seed age time of 9 days or greater for room temperature aged seeds having $SiO_2/Al_2O_3=15$.

TABLE 4

| Example # | Seed age (days) | Crystallization time (days) |
|---|---|---|
| 27 | 4 | 10 |
| 28 | 9 | 8 |
| 29 | 14 | 8 |
| 30 | 18 | 7 |
| 32 | 25 | 7 |
| 33 | 35 | 7 |

EXAMPLE 34

Preparation of Nucleant Seeds having $SiO_2/Al_2O_3=20$

A nucleant seed solution of stoichiometry, $$13.33\ Na_2O : Al_2O_3 : 20\ SiO_2 : 267\ H_2O,$$

was prepared by first preparing a sodium aluminate solution by dissolving 43.1 g. NaOH in 100 ml. distilled water. To this solution 11.2 g. of alumina trihydrate ($Al_2O_3 \cdot 3H_2O$; 156.01 g./mole; ALCOA C-31) was added and the solution was heated with stirring on a hot plate/magnetic stirrer until the alumina dissolved. The solution was cooled to room temperature. To a one liter blender was added 301.7 g. of N brand sodium silicate solution (P.Q. Corp. 8.9% $Na_2O$; 26.7% $SiO_2$) and 40 g. of distilled water. With vigorous stirring the sodium aluminate solution was slowly poured in and then rinsed in with distilled water. Enough distilled water was then added to bring the total weight of the mixture to 500 g. The mixture was again homogenized and then stored in a closed plastic or Teflon container. It was allowed to age at room temperature for 4 to 57 days.

EXAMPLES 35–40

Preparation of ECR-32.

A sodium aluminate solution was prepared by dissolving 59 g. NaOH in 100 ml. distilled water. To this solution 75 g. of aluminum trihydrate ($Al_2O_3 \cdot 3H_2O$; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 250 g.

A series of reactant gels were prepared having the stoichiometry:

$$3.6\ TPA_2O : 1.2\ Na_2O : Al_2O_3 : 18\ SiO_2 : 275\ H_2O : 0.99\ Na_2SO_4.$$

All gels were identically prepared except for the age time of the nucleant seeds. To a 250 ml. plastic beaker were added, while mixing with a spatula, 42.9 g. of 40% colloidal silica (HS-40, dupont Ludox; 40 wt. % $SiO_2$), 12.1 g. nucleant seeds (Example 34), 63.7 g. of aq. 40% TPAOH, 5.17 g. sodium aluminate solution as made above, 7.44 g. of 50% $Al_2(SO_4)_3 \cdot 17H_2O$ solution, and enough distilled water to bring the total weight of mixture to 135 g. The white gels were transferred to a blender and thoroughly homogenized. The gels were then placed in 125 ml. Teflon bottle and reacted in an air oven at 100° C.

Samples were taken periodically, filtered and washed with distilled water. Crystallization was followed by powder X-ray diffraction until completed. The following table lists the crystallization time of each example and clearly shows that seeds having $SiO_2/Al_2O_3=20$ are not as effective as seeds prepared with $SiO_2/Al_2O_3<20$.

TABLE 5

| Example # | Seed age (days) | Crystallization time (days) |
|---|---|---|
| 35 | 4 | 24 |
| 36 | 9 | 21 |
| 37 | 14 | 18 |
| 38 | 18 | 14 |
| 39 | 25 | 13 |
| 40 | 57 | 10 |

What is claimed is:

1. A process for preparing the aluminosilicates, ECR-4 or ECR-32, having a faujasite structure and a composition, in terms of mole ratios of oxides, in the range:

$$0.2\ to\ 0.80\ T_2O : 0.20\ to\ 0.8\ Na_2O : Al_2O_3 : 6\ to\ 15\ SiO_2 : xH_2O$$

wherein T represents an organic ammonium template trapped in supercages of said zeolite and x represents 0 or an integer from 1 to 20, wherein said process comprises:

(a) preparing a reaction mixture comprising an oxide of sodium, a bis-(2-hydroxyethyl) dimethyl or tetrapropyl or tetra hydroxypropyl or tetrabutyl or tetra hydroxybutyl organic ammonium salt, or combinations thereof, water, a source of silica, a source of alumina, and sodium aluminosilicate nucleating seeds, said reaction mixture having a composition, in terms of mole ratios of oxides, within the following ranges:

| | |
|---|---|
| $(Na, T)_2O:Al_2O_3$ | 3 to 15 |
| $SiO_2:Al_2O_3$ | 9 to 36 |
| $H_2O:Al_2O_3$ | 120 to 500 | where T represents the cation of the organic ammonium template, and said seeds being aged between 6 and 16 days and present in an amount to yield 0.1 to 10 mole percent of the total final alumina content in said aluminosilicate;

(b) blending the reaction mixture sufficiently to substantially form a mixture;

(c) maintaining the reaction mixture at between about 80° C. and 160° C. under autogenous pressure for a sufficient period of time to form crystals of said aluminosilicate; and (d) recovering said aluminosilicate crystals.

2. The process of claim 1 wherein the source of silica is a colloidal silica and the sources of alumina are hydrated alumina and an aluminum salt selected from the group consisting of the chloride, sulfate and nitrate salts.

3. The process of claim 2 wherein the reaction mixture is maintained between 90° and 140° C.

4. The process of claim 1 wherein said seeds are aged between 8 and 14 days.

5. The process of claim 4 wherein said seeds are aged between 10 and 12 days.

* * * * *